US008475926B2

(12) United States Patent
Ferrar et al.

(10) Patent No.: US 8,475,926 B2
(45) Date of Patent: Jul. 2, 2013

(54) INTERMEDIATE TRANSFER MEMBER AND IMAGING APPARATUS AND METHOD

(75) Inventors: Wayne T. Ferrar, Fairport, NY (US); Mark C. Zaretsky, Rochester, NY (US); William B. Vreeland, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 280 days.

(21) Appl. No.: 12/915,374

(22) Filed: Oct. 29, 2010

(65) Prior Publication Data

US 2012/0107559 A1 May 3, 2012

(51) Int. Cl.
*B32B 27/40* (2006.01)
*G03G 15/16* (2006.01)

(52) U.S. Cl.
USPC ..................... 428/425.9; 428/323; 428/423.3; 428/425.5; 399/101; 399/302

(58) Field of Classification Search
USPC ............. 428/423.1, 423.3, 425.5, 425.9, 323; 399/101, 302
See application file for complete search history.

(56) References Cited

U.S. PATENT DOCUMENTS

| | | | |
|---|---|---|---|
| 5,337,129 A | | 8/1994 | Badesha |
| 5,689,787 A | | 11/1997 | Tombs et al. |
| 5,714,288 A | | 2/1998 | Vreeland, II et al. |
| 5,968,656 A | | 10/1999 | Ezenyilimba et al. |
| 6,074,756 A | * | 6/2000 | Vreeland et al. ........... 428/423.1 |
| 6,377,772 B1 | | 4/2002 | Chowdry et al. |
| 6,497,961 B2 | | 12/2002 | Kang et al. |
| 7,252,873 B2 | | 8/2007 | Ferrar et al. |
| 7,728,858 B2 | | 6/2010 | Hara et al. |
| 7,729,650 B2 | | 6/2010 | Tamaki |
| 2004/0247347 A1 | | 12/2004 | Kuramoto et al. |
| 2008/0051275 A1 | | 2/2008 | Kittleson et al. |
| 2008/0124555 A1 | * | 5/2008 | Klun et al. .................... 428/421 |
| 2009/0074478 A1 | | 3/2009 | Kurachi |
| 2009/0074480 A1 | | 3/2009 | Suzuki |
| 2009/0250842 A1 | | 10/2009 | Okano |

FOREIGN PATENT DOCUMENTS

JP 2006-137937 1/2006

OTHER PUBLICATIONS

U.S. Appl. No. 12/713,205, filed Feb. 26, 2010, entitled Cleaning Blade for Electrostatographic Apparatus by Wayne Ferrar et al.

* cited by examiner

*Primary Examiner* — Thao T. Tran
(74) *Attorney, Agent, or Firm* — J. Lanny Tucker

(57) ABSTRACT

An intermediate transfer member for electrophotography includes a substrate and a non-ceramer polyurethane compliant layer. Disposed directly on the compliant layer is an outermost surface layer consisting essentially of a non-particulate, non-elastomeric ceramer or fluoroceramer and nano-sized inorganic particles that are distributed within the non-particulate ceramer or fluoroceramer in an amount of at least 5 and up to and including 50 weight % of the outermost surface layer. This intermediate transfer member can be incorporated into a suitable imaging apparatus for forming a toned image on a receiver element.

24 Claims, 3 Drawing Sheets

INTERMEDIATE TRANSFER MEMBER AND IMAGING APPARATUS AND METHOD

FIELD OF THE INVENTION

This invention relates to intermediate transfer members useful for electrophotography and electrophotographic imaging using a toner. Such intermediate transfer members can be incorporated into appropriate apparatus or devices used for such imaging. In particular, the invention relates to the use of a unique polyurethane ceramer overcoat in the intermediate transfer members.

BACKGROUND OF THE INVENTION

The use of an intermediate transfer member in electrophotography has been known for many years. Such intermediate transfer members can be provided in the form of belts or drums, and can provide a number of advantages in electrophotographic imaging including simplified receiver element handling, single pass duplexing, reduced wear of photoconductors, and superposition of multiple images to form multicolor images. As multicolor electrophotography has developed in recent years, the toners applied and fixed for multicolor images have been reduced in size in order to improve image resolution. However, this has increased the difficulty in transferring toner efficiently and accurately.

In electrophotographic formation of multicolor images, a plurality of different color toners is used. These different color toners necessitate the formation of separate electrostatic latent images on the primary imaging member and the development of respective electrostatic latent images with the proper colored toner. For example, in full-process color methods, latent image separations and toner colors corresponding to the subtractive primary colors, cyan, magenta, yellow, and black, are used. These separations must ultimately be transferred to a receiver member in register in order to form the multi-color image reproduction.

In many multicolor electrostatographic or electrophotographic reproduction apparatus, transferring separate colors to a receiver member is accomplished by wrapping the receiver member around an electrically biasable drum. The electrostatic latent images, which have been formed on separate areas of the photoreceptor that correspond to the periodicity of the drum, are each rendered into visible images using the separately colored toner particles. These images are then transferred, in register, to the receiver member. This process, however, has a complicated receiver member path, as the receiver member must be picked up and held by the transfer drum and then released back to the transport mechanism at the appropriate time. This process can be simplified by first transferring all the separate images, in register, to an intermediate transfer member and then transferring the entire composite image to the receiver member. In either of these two modes of operation, the output speed of the electrostatographic reproduction apparatus is reduced due to the number of sequential transfers that need to be done.

In another example of color electrostatographic reproduction apparatus, it is desirable to separate the color separation image formation process into separate and substantially identical modules. This allows each colored image to be printed in parallel, thereby increasing the speed of the reproduction apparatus. In this process, the receiver member is transported from module to module and, while it can be picked up and wrapped around a transfer roller, there generally is no need to do so. It is also desirable to firstly transfer each image to an intermediate transfer member, such as a compliant transfer intermediate member as described in U.S. Pat. No. 5,084,735 (Rimai et al.). In order to reduce the time needed to produce a printed image, it is further desirable, however, that each color is produced in a separate module comprising a primary imaging member, development station, and transfer apparatus.

In all of these processes, it is necessary to transport the receiver member through the electrostatographic reproduction apparatus. One mode of transport utilizes a transport web such as a seamless transport web to which a receiver member can be attached electrostatically or by any other well known mechanism. When such a transport web is employed, in order to facilitate registration of individual developed images on a receiver member, it is desirable to drive the image forming modules using friction, especially in the case where separate modules are used for the formation, development, and transfer of individual color separation images. This requires that the web have a sufficiently high coefficient of friction during operation as described in U.S. Pat. No. 7,252,873 (Ferrar et al.). It also requires that the intermediate transfer member have a high coefficient of friction against the photoreceptor. Although many compositions can have sufficiently high frictional coefficients initially, the presence of fuser release agents on the receiver member transport web can reduce the friction with increased usage and result in slippage in a frictionally driven electrostatographic reproduction apparatus. This can result in image defects such as mis-registration and general overall unreliability of the reproduction apparatus.

In other reproductive methods, it is necessary that a high degree of slip exists between the different components of the printer. This allows for differences in speed between the photoreceptor, intermediate transfer member, and the receiver or transport member. A low coefficient of friction is desirable for these situations where the members pass each other at different rates but the color registration is not deleteriously affected by the drag of one surface on another.

An intermediate transfer member generally includes a substrate on which is formed a relatively thick, resilient blanket or compliant layer, and a thinner outermost surface layer on which toner is held. The compliant layer is generally composed of an elastomeric polymeric material such as a polyurethane that facilitates contact of toner particles with the member because of its desired deformation properties. The compliant layer can be electrically modified to enhance the electrostatic attraction of the toner particles. Since polyurethane compliant materials do not readily release toner particles, the relatively thin outermost surface layer (or "release" layer) is necessary for the member to be effective.

Several properties of the intermediate transfer member surface are especially important. Firstly, the surface energy should be sufficiently low to facilitate release of the fine toner particles. In addition, the intermediate transfer member surface should have good wear properties against the highly abrasive conditions of the transfer process. During the transfer, pressure is exerted on the toner particles at the first nip formed by a photoconductor and the intermediate transfer member. Even higher pressure is typically exerted at the second nip, where a receiver element, most often a paper sheet, is brought into contact with the toner particles on the intermediate transfer member surface. Residual toner particles are removed at a cleaning station that may include a blade, fur brush, or magnetic brush.

The outermost surface layer of the intermediate transfer member should also have sufficient flexibility to prevent cracking during the toner transfer process. The hardness of the substrate and compliant layer on which the outermost surface layer is disposed can vary over a considerable range, so it is necessary to adjust the flexibility of the outermost surface layer appropriately. This outermost surface layer is sufficiently thin or static dissipative to prevent its acting as an insulator against development of the field necessary for electrostatic attraction of the toner particles. It should also not work against the compliant layer properties. In summary, it is important to control the surface energy, wear, electrical resistivity, and flexibility properties of the intermediate transfer member outermost surface layer. These properties can be evaluated by, respectively, contact angle measurements, abrasion test measurements, and storage modulus determination.

There are dozens of publications that describe various intermediate transfer member constructions and composition including, but not limited to, U.S. Pat. Nos. 5,084,735 (Rimai et al.), 5,337,129 (Badesha), 5,480,938 (Badesha et al.), 5,525,446 (Sypula et al.), 5,689,787 (Tombs et al.), 5,714,288 (Vreeland et al.), 5,728,496 (Rimai et al.), 5,985,419 (Schlueter, Jr. et al.), 6,548,154 (Stanton et al.), and 6,694,120 (Ishii), EP 0 747 785 (Kusaba et al.), and U.S. Patent Application Publication 2004/0247347 (Kuramoto et al.).

In addition, U.S. Pat. No. 5,968,656 (Ezenyilimba et al.) describes intermediate transfer members having an outermost surface layer that includes a ceramer comprising a polyurethane silicate hybrid organic-inorganic network.

While the noted ceramer-containing intermediate transfer member has been used commercially and successfully for years, there is a need for improved intermediate transfer members having lower coefficient of friction and improved toner transfer efficiency.

SUMMARY OF THE INVENTION

The present invention provides an intermediate transfer member comprising:

a substrate, a non-ceramer polyurethane compliant layer, and disposed directly on the compliant layer, an outermost surface layer consisting essentially of a non-particulate, non-elastomeric ceramer or fluoroceramer and nanosized inorganic particles that are distributed within the non-particulate ceramer or fluoroceramer in an amount of at least 5 and up to and including 50 weight % of the outermost surface layer.

This invention also provides an apparatus comprising:

a toner-image forming unit that uses a developer containing a toner to form a toner image on an image carrier, and the intermediate transfer member of this invention.

In addition, a method of this invention for providing a toner image on a receiver element, comprises:

A) forming an electrostatic latent image on an image carrier,

B) developing the latent image with a dry developer comprising toner particles to form a toner image, C) transferring the toner image to the intermediate transfer member of this invention, and D) transferring the toner image from the intermediate transfer member to a receiver element, for example in the presence of an electric field that urges the movement of the toner image to the receiver element.

Thus, the present invention relates to the use of a ceramer or fluoroceramer layer having a lower coefficient of friction in an intermediate transfer member. The lowered coefficient of friction is a result of the incorporation of nanosized inorganic particles ("nanoparticles") into the ceramer during the preparation of the composition while it is dissolved in solvent and before it is coated onto a substrate. The nanosized inorganic particles generally consist of inorganic oxides that are no larger than about 500 nm and generally present in an amount of at least 5 and up to and including 50 weight % of the outer surface layer. A specific example is fumed silica that is dispersed in a solvent and is essentially free of agglomerates that raise the particle size. These are fully formed oxides of the formula corresponding to a silicon dioxide, $SiO_2$. They are different chemically and physically from the partially formed suboxide $SiO_x$ that is formed as a result of the crosslinking chemistry of the polyurethane having terminal reactive alkoxysilane groups with a tetraalkoxysilane compound. The surface roughness is increased on a nanometer length scale by the incorporation of the nanosized inorganic particles, but it is unaffected on the micrometer or larger scale. Thus, examination with a light microscope would fail to differentiate as to whether nanosized inorganic particles had been incorporated into the ceramer layer.

As described below, both ceramers and fluoroceramers can be used in the invention. However, fluoroceramer coatings containing nanosized inorganic particles have lower coefficients of friction than similar ceramer coatings. In some embodiments, the polymer substrate comprises a polyurethane such as a silicate hybrid organic-inorganic network formed as a reaction product of a polyurethane having terminal reactive alkoxysilane groups with a tetraalkoxysilane compound.

In other embodiments, the fluorinated polyurethane ceramer coating comprises a fluorinated polyurethane silicate hybrid organic-inorganic network formed as a reaction product of a fluorinated polyurethane having terminal reactive alkoxysilane groups with a tetraalkoxysilane compound and nanosized inorganic particles. This composition provides superior surface quality that is maintained by the nanoparticle-containing fluoroceramer after many thousands of prints have been formed on an intermediate transfer surface. These factors combine to provide an intermediate transfer surface that has both a low coefficient of friction and superior cleaning properties (reduced "scumming") when the fluoroceramer with nanosized inorganic particles make up the surface of an intermediate transfer belt in an electrophotographic printer.

DETAILED DESCRIPTION OF THE INVENTION

Definitions

Figure 1:
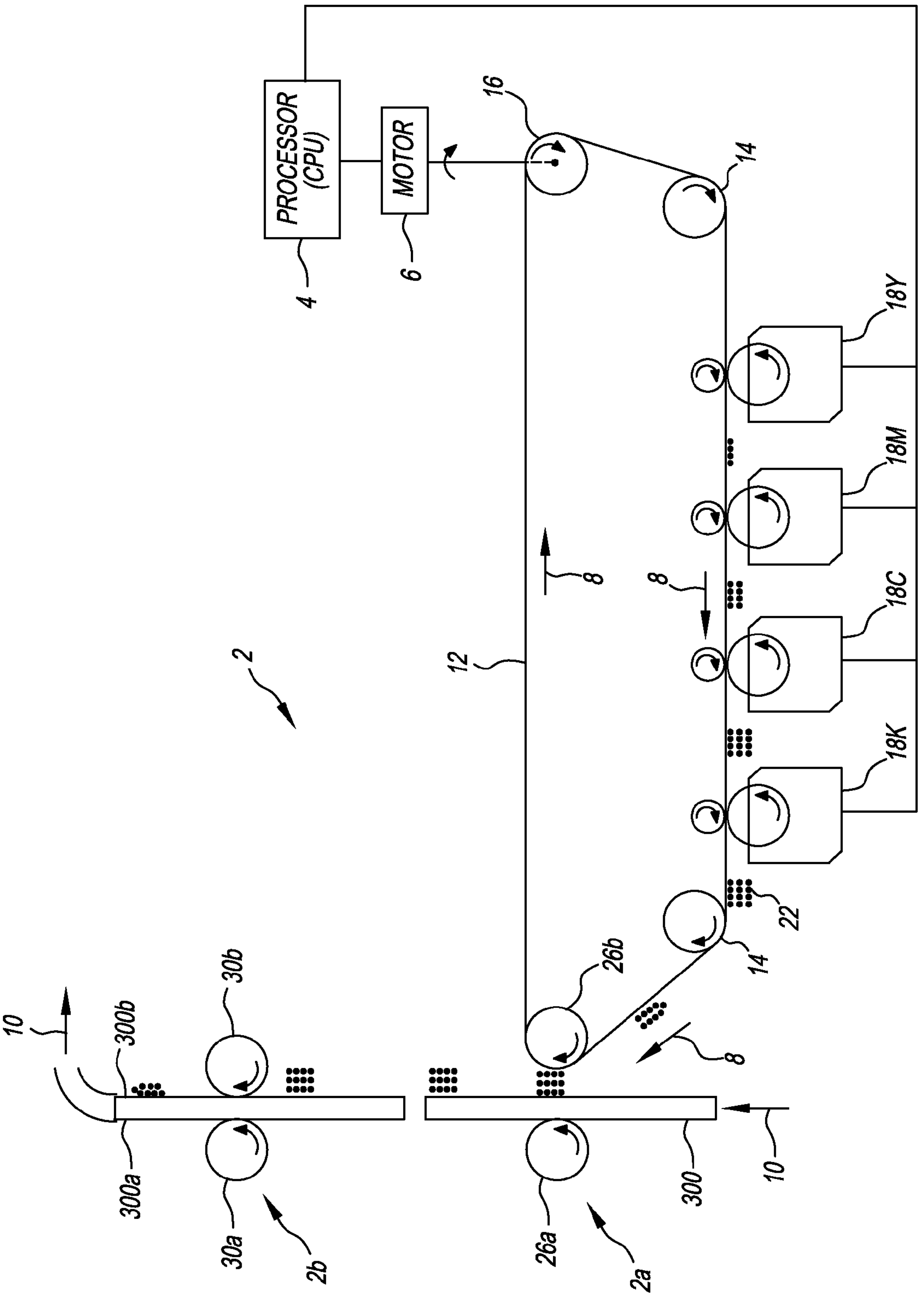
FIG. 1 is a schematic illustration of an electrostatic printing system in which an intermediate transfer member of the present invention is incorporated.

As used herein, the term "ceramer" refers to a polyurethane silicate hybrid organic-inorganic network prepared by hydrolytic polymerization (sol-gel process) of a tetraalkoxysilane compound with alkoxysilane-containing organic moieties, which may be a trialkoxysilyl-terminated organic polymer. Further details of such materials are provided in *CAS Change in Indexing Policy for Siloxanes* (January 1995).

The term "fluoroceramer" refers to a material prepared similarly to a ceramer but reacting a fluorinated polyurethane having terminal alkoxysilane moieties with a tetraalkoxysilane compound.

Unless otherwise indicated, the terms "intermediate transfer member", "transfer member", or "member" refer to embodiments of this invention. Such intermediate transfer members can be "belts" as used in the Invention Examples described below.

Intermediate Transfer Member

The intermediate transfer member useful in an electrophotographic process has a substrate upon which one or more layers are disposed. This substrate can be in the form of a roller (drum) or endless belt (seamless and jointed belts). The intermediate transfer belts can be compliant or non-compliant. The presence of a compliant layer that is soft generally aids in the complete transfer of toner. For example, the compliant layer is a soft layer that helps prevent hollow character and improve transfer uniformity when toner is transferred onto a rough receiver substrate. Urethane polymers are often used as compliant layers because they can be both soft, with a low durometer, and tough, with high tear strength. Representative roller substrates are described for example in U.S. Pat. No. 5,968,656 (Ezenyilimba et al.) that is incorporated herein by reference. A roller can have a polyurethane compliant layer on a rigid material such as an aluminum cylinder.

Suitable intermediate transfer belt substrates are often formed from a partially conductive or static dissipative thermoplastic such as polycarbonates and polyimides filled with carbon or a conductive polymer such as a polyaniline or polythiophene. While not necessary, a primer layer can be coated onto the substrate before a compliant layer is applied, or in place of the compliant layer. Other useful belt substrate compositions include polyamideimides, fluorinated resins such as poly(vinylidene fluoride) and poly(ethylene-co-tetrafluoroethylene), vinyl chloride-vinyl acetate copolymers, ABS resins, and poly(butylene or terephthalate). Mixtures of the noted resins can also be used. These resins can also be blended with elastic materials and can also include other additives including antistatic agents. The belt or roller can be formulated to have a desired Young's modulus and other properties for a given apparatus and toner transfer process. Typically, an intermediate transfer member that is in the form of a belt will have an average total thickness of at least 75 μm and up to and including 1000 μm. Such belts can have, for example, a length of at least 50 cm and up to and including 500 cm.

In most embodiments of this invention, the nanoparticle-containing ceramer or fluoroceramer composition is applied to a relatively soft polyurethane compliant layer. The chemical compatibility between the two compositions provides good adhesion of the two layers. In such embodiments, a primer layer is generally not needed. The relatively harder surface layer does not display a tendency to crack that is usually observed when a hard composition is disposed on a softer layer. Thus, the composition used in the present invention, with its high modulus (>100 MPa or MegaPascals) can be disposed on the low modulus (<50 MPa) compliant layer. This is particularly important for preparing flexible intermediate transfer members with good toner release characteristics.

The non-ceramer polyurethane compliant layer disposed on the substrate provides some flexibility to the intermediate transfer member to conform to the irregularities encountered during electrostatic toner transfer. Typically, this polyurethane is elastomeric and has a Young's modulus of from about 0.5 MPa to about 50 MPa, or more likely from about 1 MPa to about 5 MPa. This compliant layer generally has an average thickness of at least 100 μm and more likely at least 200 μm and up to and including 1000 μm.

Directly disposed on the polyurethane compliant layer is the outermost surface layer (also known as an "overcoat") consisting essentially of a non-particulate, non-fluorinated ceramer or fluoroceramer and nanosized inorganic particles. Thus, this outermost surface layer contains no other needed components for toner transfer and any additives (such as antioxidants, colorants, or lubricants) are optional. The outermost surface layer is generally transparent and has an average thickness, in dry form, of at least 1 and up to and including 20 μm, or typically at least 2 and up to and including 12 μm, or even at least 5 and up to 12 μm. The thickness ratio of the outermost surface layer to the intermediate non-ceramer polyurethane compliant layer is at least 0.002:1 and up to and including 0.1:1.

The outermost surface layer generally has a Young's modulus that is much higher than that of the compliant layer, and thus, its Young's modulus is at least 50 MPa and up to and including 2000 MPa. This Young's modulus does not appear to be affected by the presence of the nanosized inorganic particles. Surprisingly, ceramers and fluoroceramers having high amounts of alkoxysilane crosslinker and high amounts of nanosized inorganic particles do not readily crack. For example, fluoroceramer coatings prepared with tetraalkoxysilane as the crosslinker and nanosized fumed silica (about 30 weight %) dispersed therein did not crack after more than 5000 prints were prepared on an electrophotographic printing apparatus.

The outermost surface layer has a measured storage modulus of at least 0.1 and up to and including 2 GPa, or typically at least 0.3 and up to and including 1.75 GPa, or still again at least 0.5 and up to and including 1.5 GPa, when measured using a Dynamic Mechanical Analyzer (DMA).

In addition, the outermost surface layer has a dynamic (kinetic) coefficient of friction of less than 0.5 or typically less than 0.2, as measured according to the test described below in the Examples.

In addition, the outermost surface layer generally has an average surface roughness Ra of less than 50 nm, as measured by Atomic Force Microscopy (AFM).

The ceramer used in the outermost surface layer generally comprises a polyurethane silicate hybrid organic-inorganic network formed as a reaction product of a non-fluorinated polyurethane having terminal reactive alkoxysilane moieties with a tetrasiloxysilane compound. More typically, the polyurethane with terminal alkoxysilane groups is the reaction product of one or more aliphatic, non-fluorinated polyols having terminal hydroxyl groups and an alkoxysilane-substituted alkyl-substituted isocyanate compound. Suitable aliphatic polyols have molecular weights of at least 60 and up to and including 8000 and can be polymeric in composition. Polymeric aliphatic polyols can further include a plurality of functional moieties such as an ester, an ether, a urethane, a non-terminal hydroxyl, or combinations of these moieties. Polymeric polyols containing ether functions can also be polytetramethylene glycols having number average molecular weights of at least 200 and up to and including 6500, which can be obtained from various commercial sources. For example, Terathane™-2900, -2000, -1000, and -650 polytetramethylene glycols that are available from DuPont, are useful in the reactions described above.

Polyols having a plurality of urethane and ether groups are obtained by reaction of polyethylene glycols with alkylene diisocyanate compounds having 4 to 16 aliphatic carbon atoms, such as 1,4-diisocyanatobutane, 1,6-diisocyanatohexane, 1,12-diisocyanatododecane, and isophorone diisocyanate[5-isocyanato-1-(1-isocyanatomethyl)-1,3,3-trimethylcyclohexane). The reaction mixture can also include monomeric diols and triols containing 3 to 16 carbon atoms, and the triols can provide non-terminal hydroxyl substituents that provide crosslinking of the polyurethane. For example, a polymeric polyol can be formed from a mixture of isophorone diisocyanate, a polytetramethylene glycol having a number average molecular weight of about 2900, 1,4-butanediol, and trimethylolpropane in a suitable molar ratio.

The noted reactions are generally promoted with a condensation catalyst such as an organotin compound including dibutyltin dilaurate. The polyurethane having terminal reactive alkoxysilane moieties, is further reacted (acid catalyzed) with a tetraalkoxysilane compound to provide a ceramer useful in the present invention. The molar ratio of aliphatic polyol:alkoxysilane-substituted alkyl isocyanate is generally from about 4:1 to about 1:4, or from about 2:1 to about 1:2.

Further details about useful aliphatic hydroxyl-terminated polyols and alkoxy-substituted alkyl isocyanate compounds are described in U.S. Pat. No. 5,968,656 (noted above). This patent also shows a general network of the ceramer (Col. 5-6).

The fluorinated polyurethane ceramer coatings used in the present invention are advantageous because they have a low surface energy characteristic from a fluorinated moiety incorporated into the polyurethane with the durability imparted by the inorganic phase of the ceramer. Other advantages are low coefficient of friction, nonflammability, low dielectric constant, ability to dissipate static ($<1\times10^{-13}$ ohm-cm), and high solvent and chemical resistance. Fluorinated ethers were incorporated into polyurethanes as described in U.S. Pat. No. 4,094,911 (Mitsch et al.).

The fluorinated polyurethane ceramer generally comprises the reaction product of a fluorinated polyurethane silicate hybrid organic-inorganic network formed as a reaction product of a fluorinated polyurethane having terminal reactive alkoxysilane moieties with a tetraalkoxysilane compound, and can be prepared by incorporating fluorinated ethers into the polyurethane backbone before it is end-capped with the isocyanatopropyltrialkoxysilane in the preparation of a polyurethane silicate hybrid organic-inorganic network as described in U.S. Pat. No. 5,968,656 (noted above) as illustrated in Scheme 1 below. In such embodiments, the polyurethane with terminal alkoxysilane groups is the reaction product of one or more fluorinated aliphatic polyols having terminal hydroxyl groups, at least one comprising a fluorinated polyol as further discussed below, optionally one or more non-fluorinated aliphatic polyols having terminal hydroxyl groups, and an alkoxysilane-substituted alkyl isocyanate compound. Suitable aliphatic polyols typically have molecular weights of about 60 to 8000 and can be polymeric. Polymeric aliphatic polyols can further include a plurality of functional moieties such as an ester, ether, urethane, non-terminal hydroxyl, or combinations thereof. Polymeric polyols containing ether functions can be polytetramethylene glycols having number-average molecular weights at least 200 and up to and including 6500, which can be obtained from various commercial sources. For example, Terathane™-2900, -2000, -1000, and -650 polytetramethylene glycols having the indicated number-average molecular weights are available from DuPont.

Polymeric polyols containing a plurality of urethane and ether groups can be obtained by reaction of fluorinated polyols and non-fluorinated polyols (such as polyethylene glycols) with alkylene diisocyanate compounds containing about 4 to 16 aliphatic carbon atoms, for example, 1,4-diisocyanatobutane, 1,6-diisocyanatohexane, 1,12-diisocyanatododecane, and, preferably, isophorone diisocyanate (5-isocyanato-1-(isocyanatomethyl)-1,3,3-trimethylcyclohexane). The reaction mixture can further include monomeric diols and triols containing 3 to about 16 carbon atoms as the triol compounds provide non-terminal hydroxyl substituents that provide branching of the polyurethane. In some embodiments, a polymeric polyol is formed from a mixture of isophorone diisocyanate, a polytetramethylene glycol having a number-average molecular weight of about 650, a fluoroalkoxy substituted polyether polyol having a number-average molecular weight of about 6300, 1,4-butanediol, and trimethylolpropane in a molar ratio of about 9:3:0.1:5:1.

Reaction of the aliphatic polyol having terminal hydroxyl groups with an alkoxysilane-substituted alkyl isocyanate compound, which can be promoted by a condensation catalyst, for example, an organotin compound such as dibutyltin dilaurate, provides a polyurethane having terminal reactive alkoxysilane moieties, which undergoes further reaction, such as an acid-catalyzed reaction, with a tetraalkoxysilane compound to provide a useful fluoroceramer. The molar ratio of aliphatic polyol:alkoxysilane-substituted alkyl isocyanate can be from 4:1 to 1:4 or more typically from 2:1 to 1:2.

Aliphatic hydroxyl-terminated polyols used in the preparation of the fluoroceramers can be of the general formula $$HO—R^1—OH$$

and can have molecular weights of at least 60 and up to and including 8000. As previously noted, at least one polyol is usually polymeric, and $R^1$ can include a plurality of ester, ether, urethane, and non-terminal hydroxyl groups.

The alkoxysilane-substituted alkyl isocyanate compound generally has the formula $$OCN—R^2—Si(OR^3)Z^1Z^2$$

wherein $R^2$ is an alkylene group having from 2 to 8 carbon atoms, $OR^3$ is an alkoxy group having 1 to 6 carbon atoms, and $Z^1$ and $Z^2$ are independently alkoxy groups having 1 to 6 carbon atoms, hydrogen, halo, or hydroxyl groups. More typically, $R^2$ has 2 to 4 carbon atoms, and $OR^3$, $Z^1$, and $Z^2$ are each alkoxy groups having 1 to 4 carbon atoms. A useful alkoxysilane-substituted alkyl isocyanate compound is 3-isocyanatopropyl-triethoxysilane.

The tetraalkoxysilane compound can be tetramethyl orthosilicate, tetrabutyl orthosilicate, tetrapropyl orthosilicate, or more typically, tetraethyl orthosilicate ("TEOS").

The hybrid organic-inorganic network of the fluoroceramer used in the outermost surface layer of the intermediate transfer member has the general structure as illustrated in Col. 5 of U.S. Pat. No. 5,968,656 wherein $R^1$ and $R^2$ are as previously defined, with the proviso that at least a portion of the $R^1$ groups include a fluorinated moiety. The hybrid organic-inorganic network includes at least 10 and up to and including 80 weight % and more typically at least 25 and up to and including 65 weight %. The fluorinated moiety in such ceramer can be conveniently obtained wherein the aliphatic hydroxyl-terminated polyol (such as a polyether diol) employed in formation of a non-fluorinated ceramer is partially replaced with the fluorinated ether to incorporate the low surface energy component into the polymer backbone. Full replacement of the aliphatic hydroxyl-terminated polyol with the fluorinated diol is generally not desirable as the surface properties do not change a great deal after the fluoropolymer accounts for more than about 20 weight % of the end capped polymer, also known as the "masterbatch."

A number of fluoroethers are available commercially that are suitable for use in this invention. In general the dihydroxy terminated fluoroalcohols are desired because they can be polymerized directly into the urethane polymer. The use of monohydroxyfluoroalcohols is not desirable because the end groups of the ceramer masterbatch should ideally contain trialkoxysilane functionality for subsequent reaction with the sol-gel precursors. The monomers should generally be diols or triols.

One class of macromers with a perfluoropolyethere chain backbone and diol end groups is Fluorolink D10 and D10-H available from Solvay Solexis in Italy. The same fluorocarbon structure but with the hydroxy end groups attached to ethylene oxide repeat units is also available from the same vendor as Fluorolink E10-H. These macromers are between 500-700 average equivalent weights.

$$HO-CH_2-CF_2-O-(CF_2-CF_2-O)_p-(CF_2-O)_q-CH_2-OH$$

Fluorolink D10 and D10-H $$HO-(CH_2-CH_2-O)_n-CH_2-CF_2-O-(CF_2-CF_2-O)_p-(CF_2-O)_q-CF_2-CH_2-(O-CH_2-CH_2)_n-OH$$

Fluorolink E10 and E10-H

Generally higher molecular weights are desired to improve the mechanical properties of the urethane, such as ZDOLTX from Ausimont, Bussi, Italy with a number average molecular weight of 2300 and polydispersity of 1.6. Incorporation of these fluorinated blocks into polyurethanes can improve the chemical resistance and lower the coefficients of friction of thermoplastics with fluorine rich surfaces on materials with low fluorine content.

The dihydroxyfluoroethers are described in a report from the Department of Energy DOE/BC/15108-1 (OSTI ID: 750873) Novel $CO_2$-Thickeners for Improved Mobility Control Quarterly Report Oct. 1, 1998-Dec. 31, 1998 by Robert M. Enick and Eric J. Beckman from the University of Pittsburgh and Andrew Hamilton of Yale University, published February 2000 (http://www.osti.gov/bridge/servlets/purl/750873-KDMj2Z/webviewable/750873.pdf). Also described is the commercially available difunctional isocyanate terminated fluorinated ether Ausimont Fluorolink B. This urethane precursor has an average molecular weight of 3000 g/mol and a structure:

$$OCN-Ar-OCCF_2O(R^1)p(R^2)qCF_2CONH-Ar-NCO.$$

In these structures, $R^1$ is $CF_2CF_2O$, $R^2$ is $CF_2O$, and Ar is an aromatic group. In both fluorinated macromonomers, the difunctional contents are greater than 95% as characterized by NMR analysis. Ausimont describes both compounds as polydisperse.

Similar fluoroethers are also available from Aldrich Chemical, Milwaukee, Wis., USA, including multifunctional blocks. Such compounds include:

Poly(tetrafluoroethylene oxide-co-difluoromethylene oxide) α,ω-diol, $HOCH_2CF_2O(CF_2CF_2O)_x(CF_2O)_yCF_2CH_2OH$, average $M_n$≈3800;

Poly(tetrafluoroethylene oxide-co-difluoromethylene oxide) α,ω-diol bis(2,3-dihydroxypropyl ether), $HOCH_2CH(OH)CH_2OCH_2CF_2O(CF_2CF_2O)_x(CF_2O)_yCF_2CH_2OCH_2CH(OH)CH_2OH$, average $M_b$≈2000;

Poly(tetrafluoroethylene oxide-co-difluoromethylene oxide) α,ω-diol, ethoxylated $HO(CH_2CH_2O)_xCH_2CF_2O(CF_2CF_2O)_y(CF_2O)zCF_2CH_2(OCH2CH_2)_xOH$, average $M_n$≈2200; and Poly(tetrafluoroethylene oxide-co-difluoromethylene oxide) α,ω-diisocyanate, $CH_3C_6H_3(NCO)NHCO_2(CF_2CF_2O)_x(CF_2O)_yCONHC_6H_3(NCO)CH_3$, average $M_n$≈3000.

Also suitable are PolyFox® Fluorochemicals from OMNOVA Solution INC., Fairlawn, Ohio having the following structures:

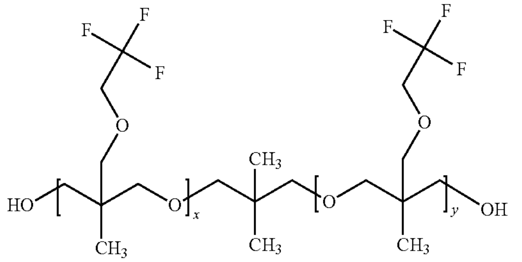

PolyFox PF-636 x + y = 6

PolyFox PF-6320 x + y = 20

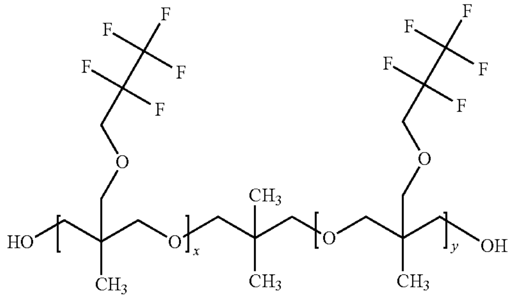

PolyFox PF-656 x + y = 6

PolyFox PF-6520 x + y = 20

These materials are thought to be more environmentally friendly than other fluorocarbons because these have only short fluorocarbon side chains.

The incorporation of the fluoromonomer can be represented as shown below in Scheme 1.

Scheme 1
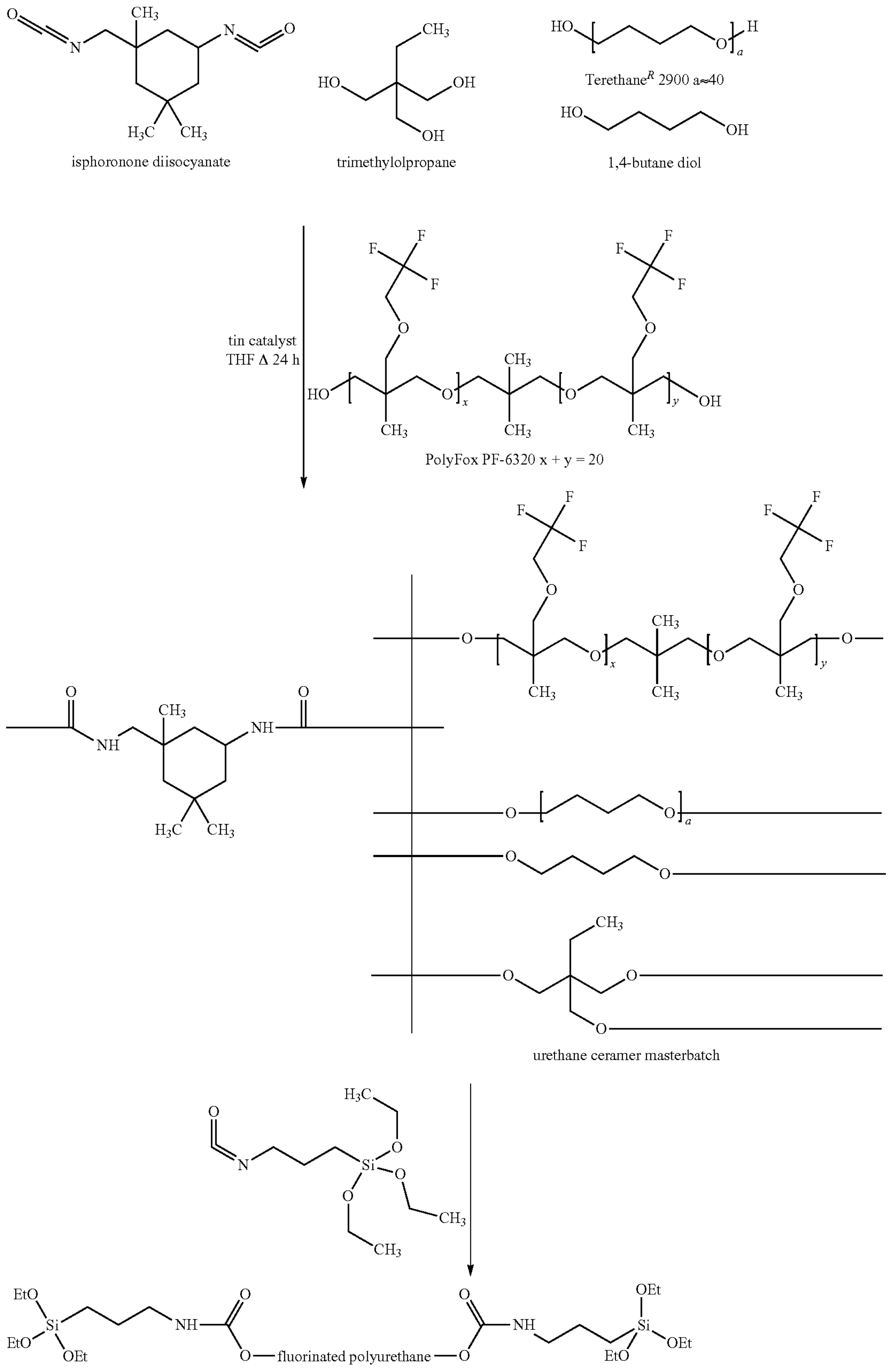
isphoronone diisocyanate
trimethylolpropane
Terethane[R] 2900 a≈40
1,4-butane diol
PolyFox PF-6320 x + y = 20
urethane ceramer masterbatch
Triethoxysilane endcapped urethane In the Examples described below, the triethoxysilane end-capped fluorinated polyurethane was allowed to react with tetraethoxyorthosilicate (TEOS) in the presence of acid and water to hydrolyze and condense the siloxane into a silsesquioxane network. These materials were coated on nickelized PET and cured overnight at 80° C. to form a polyurethane silicate hybrid organic-inorganic network.

Trialkoxyfluorosilanes can also be used to introduce fluorinated alkyl groups into the fluoroceramer. The carbon-silicon bond is stable in both acid and base. These bonds are unlike the hydrolyzable silicon-oxygen of the silicon alkoxides that cleave and form the condensation products of the fluoroceramer. Thus, in the same way, the end capped fluorourethane will be incorporated into the fluoroceramer product, so too will be the fluoroalkyl moiety that is part of an alkyltrialkoxysilane. Many silanes are available commercially including nonafluorohexyltriethoxysilane, nonafluorohexyltrimethoxysilane, (heptadecafluoro-1,1,2,2-tetrahydrodecyl)triethoxysilane, and (heptadecafluoro-1,1,2,2-tetrahydrodecyl)trimethoxysilane. Additionally, more reactive groups can be used in place of the alkoxy groups. For example, both chloro and amino groups will hydrolyze from the silicon atom in the presence of alcohol or water. An example of the fluoroalkylsilane with hydrolysable chloro functionality is (heptadecafluoro-1,1,2,2-tetrahydrodecyl) trichlorosilane. The condensation of trihydroxy-substituted silicon atoms that contain an alkyl group are known as silsesquioxanes, and are sometimes represented by the formula $RSiO_{1.5}$, which would describe the product of the derivatized fluorinated urethane if TEOS is replaced with the trialkoxysilane. Mixing TEOS with the fluorinated trialkoxysilane would produce a material somewhere between a silsesquioxane and a ceramer. Additionally, a certain level of di- or monohydrolysable fluoroalkylsilane can be used to incorporate fluorinated groups into the fluoroceramer. These include heneicosafluorododecyltrichlorosilane and (heptadecafluoro-1,1,2,2-tetrahydrodecyl)methyldichlorosilane.

The ceramer or fluoroceramer comprises at least 50 and up to and including 95 weight %, or typically at least 60 and up to and including 90 weight %, of the outermost surface layer. Mixtures of either or both ceramers and fluoroceramers can be used if desired.

Distributed within the outermost surface layer are nanosized inorganic particles. By "nanosized", we mean the particles have a average largest dimension of at least 1 and up to and including 500 nm, or typically of at least 10 and up to and including 100 nm so that the particles disrupt the surface to a very limited extent (little effect on surface roughness), for example when the outermost surface layer has an average thickness of less than 10 μm. The small nanosized inorganic particles also provide clear coatings that are relatively transparent to light that can be an advantage for densitometry readings of toner particles on the intermediate transfer member. These particles can be present in any desirable size and shape but generally, they are essentially spherical. However, elongated, acircular, plate-like, or needle-like particles are also useful. The average particle size can be determined by light scattering and electron microscopy.

Particularly useful inorganic particles are metal oxides such as alumina or silica particles, for example spherical silica or alumina particles. Mixtures of alumina and silica particles can be used if desired. In some embodiments, the inorganic particles are triboelectrically charging metal oxide particles. Useful inorganic particles can be readily obtained from several commercial sources. Silica particles that are not agglomerated to large secondary particles are available in solvents such as water, various alcohols, and methyl ethyl ketone (MEK) that is also known as 2-butanone. These particles are available from Nissan Chemical of America in Texas as ORGANOSILICASOL™ colloidal silica mono-dispersed in organic solvent.

Dispersions of agglomerated alumina can also be prepared from dry powders such as gamma-alumina. These agglomerates can be broken down into nanosized inorganic particles that are stable in different solvents using various types of milling achieve different particle sizes, including ball milling and media milling. High quality gamma-alumina powders that can be milled into stable, translucent dispersions are available from Sasol of Americal in Houston, Tex.

The nanosized inorganic particles are generally present in the outermost surface layer in an amount of at least 5 and up to and including 50 weight % of the total solids of the outermost surface layer. More likely, the nanosized inorganic particles are present in an amount of at least 10 and up to and including 40 weight % of the outermost surface layer.

The intermediate transfer member of this invention can be incorporated into a suitable apparatus that can be used for electrostatic or electrostatographic imaging, and the intermediate transfer member can be used to receive toner particles from a toner image carrier such as a photoconductor element and then transfer the particles to a suitable receiver element.

Such an apparatus for providing an electrostatographic image includes at least a toner-image forming unit that uses a developer containing a toner to form a toner image on a toner image carrier (such as a photoconductor), and the intermediate transfer member of this invention. Other components or stations are often present as one skilled in the art would readily understand. Representative apparatus in which the intermediate transfer member of this invention can be incorporated are described for example, in U.S. Pat. Nos. 5,666,193 (Rimai et al.), 5,689,787 (Tombs et al.), 5,985,419 (Schlueter, Jr. et al.), 5,714,288 (Vreeland et al.), 6,548,154 (Stanton et al.), 6,694,120 (Ishii), 7,728,858 (Hara et al.), and 7,729,650 (Tamaki), U.S. Patent Application Publications 2004/0247347 (Kuramoto et al.), 2009/0250842 (Okano), 2009/0074478 (Kurachi), and 2009/0074480 (Suzuki), and EP 0 747 785 (Kusaba et al.), all incorporated herein by reference to show apparatus features.

For example, the toner-image forming unit can have a charging device that produces electric charge on the toner image carrier, an exposure device that forms an electrostatic latent image on the image carrier, and a developing device that develops the electrostatic latent image with the developer containing the toner to form a toner image.

In addition, the apparatus can further comprise a receiver element device that can hold receiver elements (such as sheets of paper) to which the toner image can be transferred from the intermediate transfer member. The intermediate transfer member in this apparatus can be an endless belt.

Further, the apparatus can further comprise a fixing unit for fixing the toner image on a receiver element.

In simple terms, a toner image on a receiver element can be formed using the intermediate transfer member of this invention by:

A) forming an electrostatic latent image on an image carrier,

B) developing the latent image with a dry developer comprising toner particles to form a toner image, C) transferring the toner image to the intermediate transfer member described herein (for example an endless belt as described above), and D) transferring the toner image from the intermediate transfer member to a receiver element in the presence of an electric field that urges the movement of the toner image to the receiver element.

Dry developers that can be used in the practice of this invention are well known in the art and typically include carrier particles and toner particles containing a desired pigment.

This method can further comprise fixing the toner image on the receiver element.

Referring now to FIG. 1, electrophotographic printer (EP) 2 includes a group of modules 18K, 18C, 18M, and 18Y, secondary transfer station 2*a*, fusing station 2*b*, and processor 4. Modules 18K, 18C, 18M, and 18Y are known and each contains a photoconductor for storing electrostatic charge, a charging device for depositing uniform electrostatic charge on the surface of the photoconductor, a light exposure device for creating an electrostatic latent image on the photoconductors in an imagewise fashion, and a development station for depositing toner onto the electrostatic latent image. The photoconductor in each of module 18K, 18C, 18M, and 18Y, is in nipped contact with an intermediate transfer member 12 via a backup roller for electrostatically transferring the toner from the photoconductor to the intermediate transfer member 12. Processor 4 provides necessary electrical signals to operate modules 18K, 18C, 18M, and 18Y, a high voltage AC power supply (not shown), and motor 6. Motor 6 turns drive roller 16, set of nipped transfer rollers 26*a* and 26*b* and a set of nipped fuser rollers 30*a* and 30*b*. Sheet 300 that be used in accordance with the present invention can be any receiver capable of receiving toner to form a toner image. In FIG. 1, sheet 300 is movable along sheet path 10 defined by nipped transfer rollers 26*a* and 26*b* and the nipped fuser rollers 30*a* and 30*b*, graphically illustrated by the arrows labeled 10. Negatively charged toner 22 is transferred from modules 18K, 18C, 18M, and 19Y to intermediate transfer member 12 movable along rotational transport path 8 defined by rollers 14, drive roller 16, and nipped transfer roller 26*b*, graphically represented by arrows labeled 8.

Negatively-charged toner 22 is then carried by intermediate transfer member 12 to secondary transfer station 2*a*. Negatively-charged toner 22 is electronically transferred to sheet 300 as it passes through nipped transfer rollers 26*a* and 26*b*. Charged sheet 300 is then passed through fusing station 2*b* located after secondary transfer station 2*a*. Fusing station 2*b* has nipped fusing rollers 30*a* and 30*b* that apply heat and pressure to charged sheet 300 to fuse or fix negatively-charged toner 22 to charged sheet 300. Upon exiting fusing station 2*b*, charged sheet 300 has untoned side 300*a* and toned side 300*b*.

The present invention provides at least the following embodiments and combinations thereof, but other combinations of features are considered to be within the present invention as a skilled artisan would appreciate from the teaching of this disclosure:

1. An intermediate transfer member comprising:

a substrate, a non-ceramer polyurethane compliant layer, and disposed directly on the compliant layer, an outermost surface layer consisting essentially of a non-particulate, non-elastomeric ceramer or fluoroceramer and nanosized inorganic particles that are distributed within the non-particulate ceramer or fluoroceramer in an amount of at least 5 and up to and including 50 weight % of the outermost surface layer.

2. The intermediate transfer member of embodiment 1 wherein the inorganic particles have an average largest dimension of at least 1 and up to 500 nm.

3. The intermediate transfer member of embodiment 1 or 2 wherein the inorganic particles have an average largest dimension of at least 10 and up to and including 100 nm.

4. The intermediate transfer member of any of embodiments 1 to 3 wherein the inorganic particles are triboelectrically charging metal oxide particles.

5. The intermediate transfer member of any of embodiments 1 to 4 wherein the inorganic particles are spherical silica or alumina particles.

6. The intermediate transfer member of any of embodiments 1 to 5 wherein the ceramer comprises a polyurethane silicate hybrid organic-inorganic network formed as a reaction product of a non-fluorinated polyurethane having terminal reactive alkoxysilane groups with a tetraalkoxysilane compound, and the fluoroceramer comprises a fluorinated polyurethane silicate hybrid organic-inorganic network formed as a reaction product of a fluorinated polyurethane having terminal reactive alkoxysilane groups with a tetraalkoxysilane compound.

7. The intermediate transfer member of embodiment 6 wherein the ceramer polyurethane having terminal alkoxysilane groups comprises the reaction product of one or more aliphatic non-fluorinated polyols having terminal hydroxyl groups and an alkoxysilane alkyl-substituted isocyanate compound, and the fluoroceramer polyurethane having terminal alkoxysilane groups comprises the reaction product of one or more fluorinated aliphatic polyols having terminal hydroxyl groups, one or more non-fluorinated aliphatic polyols having terminal hydroxyl groups, and an alkoxysilane alkyl-substituted isocyanate compound.

8. The intermediate transfer member of any of embodiments 1 to 7 that is an endless belt.

9. The intermediate transfer member of any of embodiments 1 to 8 wherein the outermost surface layer has a thickness of at least 1 μm and up to and including 20 μm.

10. The intermediate transfer member of any of embodiments 1 to 9 wherein the outermost surface layer has a thickness of at least 5 μm and up to and including 12 μm.

11. The intermediate transfer member of any of embodiments 1 to 10 wherein the ratio of the thickness of the outermost surface to the thickness of the compliant layer is at least 0.002:1 and up to and including 0.1:1.

12. The intermediate transfer member of any of embodiments 1 to 11 wherein the outermost surface layer has a surface roughness, Ra of less than 50 nm.

13. The intermediate transfer member of any of embodiments 1 to 12 wherein the outermost surface layer has a static or dynamic (kinetic) coefficient of friction less than 0.4.

14. The intermediate transfer member of any of embodiments 1 to 13 wherein the outermost surface layer is transparent.

15. The intermediate transfer member of any of embodiments 1 to 14 wherein the compliant layer has a thickness of at least 100 μm and up to and including 500 μm.

16. The intermediate transfer member of any of embodiments 1 to 15 wherein the ceramer or fluoroceramer comprises at least 50 and up to and including 95 weight % of the outermost surface layer.

17. The intermediate transfer member of any of embodiments 1 to 16 wherein the outermost surface layer has a storage modulus of at least 0.1 and up to and including 2 GPa.

18. An apparatus comprising:

a toner-image forming unit that uses a developer containing a toner to form a toner image on a toner image carrier, and the intermediate transfer member of any of embodiments 1 to 16.

19. The apparatus of embodiment 18 further wherein the toner image carrier is a photoconductor.

20. The apparatus of embodiment 18 or 19 wherein the toner-image forming unit has a charging device that produces electric charge on the toner image carrier, an exposure device that forms an electrostatic latent image on the image carrier, and a developing device that develops the electrostatic latent image with the developer containing the toner to form a toner image.

21. The apparatus of any of embodiments 18 to 20 that further comprises a receiver element device that can hold receiver elements to which the toner image can be transferred from the intermediate transfer member.

22. The apparatus of any of embodiments 18 to 21 further comprising a fixing unit for fixing the toner image on a receiver element.

23. A method of providing a toner image on a receiver element, comprising:

A) forming an electrostatic latent image on an image carrier,

B) developing the latent image with a dry developer comprising toner particles to form a toner image, C) transferring the toner image to the intermediate transfer member of any of embodiments 1 to 17, and D) transferring the toner image from the intermediate transfer member to a receiver element.

24. The method of embodiment 23 further comprising fixing the toner image on the receiver element.

The following Examples are provided to illustrate the practice of this invention and are not meant to be limiting in any manner.

Preparation of Ceramer and Fluoroceramer Solutions:

Ceramer Masterbatch:

To a one liter, three-neck round bottom flask containing dry tetrahydrofuran (THF) (300 ml) under nitrogen was added Terathane™ 2900 polytetramethylene glycol (79.13 g, 0.027 mol), 1,4-butanediol (3.97 g, 0.044 mol), and trimethylolpropane (1.21 g, 0.0090 mol). This mixture was stirred under nitrogen until a solution was obtained and then isophorone diisocyanate (15.69 g, 0.071 mol) was added, and then the mixture was degassed under reduced pressure (0.1 mm Hg). Dibutyltin dilaurate (0.20 g, 0.0003 mol) was added and the mixture was heated at 60° C. under nitrogen for 5 hours. To this solution were added 3-isocyanatopropyltriethoxysilane (7.98 g, 0.033 mol) and additional THF (85 ml). The mixture was heated at 60° C. for 15 hours, yielding a solution containing 24 weight % dissolved solids.

10 Weight % Fluoroceramer Masterbatch:

To a 500 ml, three-neck round bottom flask containing dry tetrahydrofuran (THF) (150 ml) under nitrogen were added Terathane™ 650 polytetramethylene glycol (19.45 g, 0.030 mol), 1,4-butanediol (4.25 g, 0.047 mol), Polyfox® PF-6320 surfactant (5.36 g, 0.0014 mol) and trimethylolpropane (1.30 g, 0.010 mol). The resulting mixture was stirred under nitrogen until a solution was obtained and then isophorone diisocyanate (19.64 g, 0.088 mol) was added, and the mixture was degassed under reduced pressure (0.1 mm Hg). Dibutyltin dilaurate (0.10 g, 0.0002 mol) was added, and the resulting mixture was heated at 60° C. under nitrogen for 5 hours. To this solution, were added 3-isocyanatopropyl-triethoxysilane (4.04 g, 0.0081 mol) and additional THF (35 ml). The mixture was heated at 60° C. for 15 hours, yielding a solution containing 24 weight % dissolved solids.

Comparative Example 1

Non-Fluorinated Ceramer with 1.87 TEOS/Polymer by Weight

To 15 g of the Ceramer Masterbatch described above, in a 100 ml plastic beaker were added isopropanol (7 ml) and tetraethyl orthosilicate, TEOS (6.73 g, 0.032 mol). The solution was stirred at room temperature for several minutes, followed by the addition of 0.15 N triflic acid (2.63 ml). The resulting solution was stirred at room temperature for 48 hours, after which Silwet® L-7002 (0.059 g) was added. The resulting solution was stirred for 15 minutes longer before coating or casting, and then diluted with isopropanol to 6 weight % solids before coating.

Comparative Example 2

A solution was prepared as described in Comparative Example 1 except that 0.15 N hydrochloric acid was used in place of 0.15 N triflic acid.

Comparative Example 3

Fluorinated Ceramer 10 Weight % Fluorinated Ceramer with 1.47 TEOS/Polymer by Weight To 50 g of the 10 Wt. % Fluoroceramer Masterbatch described above, in a 500 ml plastic beaker were added isopropanol (18 ml) and TEOS (17.7 g, 0.085 mol). The resulting solution was stirred at room temperature for several minutes, followed by the addition of 0.15 N hydrochloric acid (6.84 ml). This solution was then stirred at room temperature for 48 hours, after which Silwet® L-7002 surfactant (0.18 g) was added. The resulting solution was stirred for 15 minutes longer before coating or casting.

Comparative Example 4

A carbon-filled static-dissipative polycarbonate web substrate from obtained from Gunze (Japan) was used in this example.

Comparative Example 5

A static-dissipative polyimide web substrate filled with conductive polyaniline obtained from DuPont was used in this example.

Invention Example 1

10 Weight % Fluorinated Ceramer with 1.47 TEOS/Polymer and 0.67 MEK-ST Silica/TEOS To a stirred, glass jar previously charged with the ORGANOSILICASOL™ MEK-ST (34.74 g), isopropyl alcohol (38 ml), and 0.15 N triflic acid (5.98 ml) were added the 10 weight % Fluorinated Masterbatch (43.73 g) that had been previously diluted with isopropanol (40 ml). Additional isopropanol (IPA, 100 ml) was added slowly to achieve a clear solution of the fluoroceramer containing the silica particles, followed by dropwise addition of TEOS (15.44 g, 0.074 mol). The solution was stirred at room temperature for 48 hours, after which Silwet® L-7002 (1.55 g of a 10 weight % solution in IPA) was added. Part of this solution (12.4 weight % solids) was used to prepare castings or stirred overnight and diluted with IPA to 7 weight % solids before coating.

Coatings were prepared on a roll of static-dissipative polycarbonate substrate obtained from Gunze (Japan). The 100 μm thick substrate was black because of dispersed carbon. A 200 μm thick layer of static-dissipative polyurethane from Lubrizol had been previously extruded onto the polycarbonate to form a compliant layer. The polyurethane-coated polycarbonate had a durometer reading of about 60 MPa. The fluoroceramer coatings were then coated onto the polyurethane-coated polycarbonate using a roll-roll coating machine and dye slot coating head and 5 dryers through which the outermost coated web was transported to remove solvent and initiate curing of the fluoroceramer. Upon completion of fluoroceramer coating, the resulting web was unwound and placed in an 80° C. oven for 24 hours to complete curing of the 4 μm fluoroceramer outermost surface layer to form intermediate transfer members of this invention.

Alternatively, the polyurethane-coated polycarbonate was formed into an endless belt of this invention by tapping or welding the ends of the web and applying the fluoroceramer onto it using a ring-coater where the belt was place on a mandrel and pulled through a gasket that had the fluoroceramer coating solution sitting on top of it. Coatings of the fluoroceramers were also prepared directly onto poly(ethylene terephthalate) (PET) films for comparison to the intermediate transfer members of this invention having a compliant layer.

The fluoroceramer coatings were analyzed for coefficient of friction using a 200 g weighted sled wrapped with each coating, and pulling the sled over a sheet of photoconductor that had been placed on a vacuum platen. A load cell was used to measure the force needed to move the fluoroceramer coating against the photoconductor, the results were recorded using a computer, and the static and dynamic coefficients of friction were calculated. A graph was generated during the experiments to eliminate samples where the sled 200 g weight would leap or jump because of a stick-slip type of friction.

The roughness of the outermost surface layer of each intermediate transfer member was determined using a Veeco atomic force microscope using 10×10 and 20×20 scan areas. The nanoparticle-containing surface coatings were formed into belts and placed in a modified Kodak electrophotographic printer.

Images were transferred from a photoconductor to the intermediate transfer belt and then to a receiver element (paper sheets) to ensure good image quality. The efficiency of toner transfer from the photoconductor to the intermediate transfer belt was measured as follows: 1) clear adhesive tape was used to remove the toner deposits on the photoconductor prior to and after toner transfer to the intermediate transfer belt, 2) these tapes were adhered to a transparency stock and the transmission density of the unfused toner deposits was measured ($D_{before}$ and $D_{after}$), and 3) the transfer efficiency from the photoconductor to the intermediate transfer belt ("$\eta_1$", %) was computed as $100\times[1-(D_{after}/D_{before})]$. The efficiency of toner transfer from the intermediate transfer belt to the receiver sheet ("$\eta_2$", %) was measured in a similar manner. The total toner transfer efficiency from the photoconductor to the receiver element, "$\eta_{total}$", was then computed as $\eta_1\times\eta_2$. The deviation from 100% toner transfer efficiency was then computed as $100-\eta_{total}$ (%). This deviation was calculated for three image density values and three transfer current bias levels and an average deviation was calculated using these 9 individual deviations. The average deviation was used as the "transfer efficiency robustness" value, and it is desirable that this value be as small as possible with the ideal value being zero (0%).

Invention Example 2

Invention Example 1 was repeated except that ORGANOSILICASOL™ IPA-ST was used in place of ORGANOSILICASOL™ MEK-ST and the level of TEOS was 75% as much.

Invention Example 3

Invention Example 1 was repeated except that ORGANOSILICASOL™ MEK-ST-L was also added to the fluoroceramer and the level of TEOS was 50% as much.

Invention Example 4

Invention Example 3 was repeated except the amounts of ORGANOSILICASOL™ MEK-ST and ORGANOSILICASOL™ MEK-ST-L were reversed.

Invention Example 5

Invention Example 1 was repeated.

Invention Example 6

Invention Example 2 was repeated.

Invention Example 7

Invention Example 6 was repeated except that ORGANOSILICASOL™ MEK-ST was used.

Invention Example 8

Invention Example 6 was repeated using more TEOS.

Invention Example 9

Invention Example 5 was repeated using ORGANOSILICASOL™ IPA-ST.

Invention Example 10

Invention Example 9 was repeated with increased TEOS.

Invention Example 11

Invention Example 10 was repeated with increased TEOS.

Invention Example 12

Invention Example 11 was repeated with increased TEOS.

Invention Example 13

Invention Example 6 was repeated except the fluoroceramer surface layer formulation was ring coated onto the compliant layer instead of hopper coated.

Invention Example 14

Invention Example 12 was repeated except with ORGANOSILICASOL™ MEK-ST.

Comparative Example 6

Invention Example 14 was repeated except the nanoparticle-containing fluoroceramer surface layer formulation was coated almost 65% thicker. Cracking of the fluoroceramer layer was observed after the print evaluation testing.

Invention Example 15

Invention Example 12 was repeated.

Comparative Example 7

Comparative Example 6 was repeated except the nanoparticle-containing fluoroceramer formulation was coated almost 65% thicker. Cracking of the fluoroceramer layer was observed after print evaluation testing.

Invention Example 16

Ceramer with 1.40 TEOS/Polymer and 0.9 IPA-ST/TEOS

To a stirred, glass jar previously charged with ORGANOSILICASOL™ MEK-ST (50.41 g), isopropyl alcohol (62 ml), and 0.15 N triflic acid (8.75 ml) was added the Ceramer Masterbatch (50.0 g previously diluted with isopropanol (40 ml). Additional isopropanol (60 ml) was added slowly to achieve a clear solution of the ceramer with silica, followed by the dropwise addition of TEOS (16.80 g, 0.081 mol). This solution was stirred at room temperature for 48 hours, after which Silwet® L-7001 (1.97 g of a 10 weight % solution in IPA) was added. Part of this solution (12.3 weight % solids) was used to prepare castings or stirred overnight and diluted with IPA to 7 weight % solids before coating.

Invention Example 17

Invention Example 16 was repeated except the level of TEOS was 33% more.

Invention Example 18

Invention Example 16 was repeated except ORGANOSILICASOL™ IPA-ST was used in place of MEK-ST.

Invention Example 19

Invention Example 16 was repeated except the level of TEOS was 33% more.

Invention Example 20

Invention Example 16 was repeated except ORGANOSILICASOL™ IPA-ST and gamma-alumina were used with 0.46 TEOS/polymer.

Invention Example 21

Invention Example 20 was repeated except different levels of gamma-alumina were used with 0.9 TEOS/polymer.

Invention Example 22

Invention Example 20 was repeated except different levels of ORGANOSILICASOL™ IPA-ST and gamma-alumina were used with 0.46 TEOS/polymer.

Invention Example 23

Invention Example 16 was repeated except half the TEOS and MEK-ST and MEK-ST-L were used.

Invention Example 24

Invention Example 1 was repeated.

The results from evaluations of these various intermediate transfer members are presented in TABLE I below.

TABLE I

| Example | Outermost Surface Layer | Masterbatch (g) | TEOS (g) | Initial IPA (ml) | Additional IPA (ml) | IPA-ST Dispersion (g) | MEK-ST Dispersion (g) | MEK-ST-L dispersion (g) | Gamma-alumina dispersion (g) | Triflic acid (ml) |
|---|---|---|---|---|---|---|---|---|---|---|
| Comparative 1 | Ceramer, no nanoparticles | 15.0 | 6.7 | 7.0 | 0 | NA | NA | NA | NA | 2.6 |
| Comparative 2 | Ceramer, no nanoparticles | 15.0 | 6.7 | 7.0 | 0 | NA | NA | NA | NA | 2.6 HCl |
| Comparative 3 | Fluoroceramer, no nanoparticles | 50.0 | 17.7 | 18.0 | 0.0 | | | | | 6.8 HCl |
| Comparative 4 | Polycarbonate, no nanoparticles, no compliant layer | NA | NA | NA | NA | NA | NA | NA | NA | NA |
| Comparative 5 | Polyimide, no nanoparticles, no compliant layer | NA | NA | NA | NA | NA | NA | NA | NA | NA |
| Comparative 6 | Fluoroceramer with nanoparticles, too thick | 50.0 | 35.31 | 38 + 40 | 40 | NA | 39.73 | NA | NA | 6.84 |
| Comparative 7 | Fluoroceramer with nanoparticles, too thick | 50.0 | 35.31 | 38 + 40 | 40 | 39.73 | NA | NA | NA | 6.84 |
| Invention 1 | Fluoroceramer with nanoparticles | 43.7 | 15.44 | 38 + 40 | 100 | NA | 34.74 | NA | NA | 5.98 |
| Invention 1a* | Fluoroceramer with nanoparticles | 43.7 | 15.44 | 38 + 40 | 100 | NA | 34.74 | NA | NA | 5.98 |
| Invention 2 | Fluoroceramer with nanoparticles | 45.0 | 11.92 | 38 + 40 | 80 | 11.92 | NA | NA | NA | 6.15 |
| Invention 3 | Fluoroceramer with nanoparticles | 50.0 | 8.83 | 38 + 25 | 100 | NA | 39.73 | 13.24 | NA | 6.84 |
| Invention 4 | Fluoroceramer with nanoparticles | 50.0 | 8.83 | 38 + 25 | 80 | NA | 13.24 | 39.73 | NA | 6.84 |

TABLE I-continued

| Example | Outermost Surface Layer | Master-batch (g) | TEOS (g) | Initial IPA (ml) | Additional IPA (ml) | IPA-ST Dispersion (g) | MEK-ST Dispersion (g) | MEK-ST-L dispersion (g) | Gamma-alumina dispersion (g) | Triflic acid (ml) |
|---|---|---|---|---|---|---|---|---|---|---|
| Invention 5 | Fluoroceramer with nanoparticles | 50.0 | 17.66 | 38 + 40 | 80 | NA | 39.73 | NA | NA | 6.84 |
| Invention 6 | Fluoroceramer with nanoparticles | 50.0 | 13.24 | 38 + 40 | 80 | 13.24 | NA | NA | NA | 6.84 |
| Invention 7 | Fluoroceramer with nanoparticles (ring coated) | 50.0 | 13.24 | 38 + 40 | 80 | 13.24 | NA | NA | NA | 6.84 |
| Invention 8 | Fluoroceramer with nanoparticles | 50.0 | 13.24 | 38 + 40 | 120 | NA | 13.24 | NA | NA | 6.84 |
| Invention 9 | Fluoroceramer with nanoparticles | 50.0 | 17.66 | 38 + 40 | 80 | 13.24 | NA | NA | NA | 6.84 |
| Invention 10 | Fluoroceramer with nanoparticles | 50.0 | 17.66 | 38 + 40 | 60 | 39.73 | NA | NA | NA | 6.84 |
| Invention 11 | Fluoroceramer with nanoparticles | 50.0 | 23.48 | 38 + 40 | 60 | 39.73 | NA | NA | NA | 6.84 |
| Invention 12 | Fluoroceramer with nanoparticles | 50.0 | 29.31 | 38 + 40 | 60 | 39.73 | NA | NA | NA | 6.84 |
| Invention 13 | Fluoroceramer with nanoparticles | 50.0 | 35.31 | 38 + 40 | 60 | 39.73 | NA | NA | NA | 6.84 |
| Invention 13a** | Fluoroceramer with nanoparticles | 50.0 | 35.31 | 38 + 40 | 60 | 39.73 | NA | NA | NA | 6.84 |
| Invention 14 | Fluoroceramer with nanoparticles | 50.0 | 35.31 | 38 + 40 | 40 | NA | 39.73 | NA | NA | 6.84 |
| Invention 15 | Fluoroceramer with nanoparticles | 50.0 | 35.31 | 38 + 40 | 40 | 39.73 | NA | NA | NA | 6.84 |
| Invention 16 | Ceramer with nanoparticles | 50.0 | 16.8 | 62 + 40 | 60 | NA | 50.41 | NA | NA | 8.75 |
| Invention 17 | Ceramer with nanoparticles | 50.0 | 22.41 | 62 + 40 | 60 | NA | 50.41 | NA | NA | 8.75 |
| Invention 18 | Ceramer with nanoparticles | 50.0 | 16.8 | 62 + 40 | 40 | 50.41 | NA | NA | NA | 8.75 |
| Invention 19 | Ceramer with nanoparticles | 50.0 | 22.41 | 62 + 40 | 40 | 50.41 | NA | NA | NA | 8.75 |
| Invention 20 | Ceramer with nanoparticles | 25.0 | 2.8 | 31 | 20 | 6.30 | NA | NA | 12.60 | 4.37 |
| Invention 21 | Ceramer with nanoparticles | 25.0 | 5.6 | 31 | 20 | 4.20 | NA | NA | 4.20 | 4.37 |
| Invention 22 | Ceramer with nanoparticles | 25.0 | 2.8 | 31 | 20 | 8.40 | NA | NA | 4.20 | 4.37 |
| Invention 23 | Ceramer with nanoparticles | 50.0 | 17.66 | 38 + 40 | 60 | NA | 39.73 | NA | NA | NA |
| Invention 24 | Fluoroceramer with nanoparticles | 50.0 | 17.66 | 38 + 40 | 60 | 39.73 | NA | NA | NA | 6.84 |

*Invention 1 measured after 5,000 prints
**Invention 13 measured after 5,000 prints
NA = not applicable The characterization of the ceramer or fluoroceramer outermost surface layer (overcoat) and the results from using the intermediate transfer members (belts) in a modified Kodak® Digimaster printer are provided below in TABLE II. Coefficients of Friction (COF) Static and Kinetic were determined using a model 3M90 slip-peel tester from Analogic Measurometer II (Instrometers, Inc.). The fluoroceramer- or ceramer-coated intermediate transfer member was wrapper around a 200 g metal weight and placing the weight on a platen-covered with a ceramic photoreceptor film. The force required to move the weight over the surface of the photoreceptor film for 300 mm was measured by a load cell connected to a computer using Labview System ID #66 that calculated the static and kinetic coefficients of friction. Average surface roughness (Ra) was determined using commercial software on a Vecco Instruments CP-II Scanning Probe Microscope from surface scans of 10×10 μm sample areas. Transfer Efficiency Robustness was determined as described above.

TABLE II

| Example | Outermost Surface Layer | COF Static | COF Kinetic | Average Surface Roughness (Ra) (nm) | Transfer Efficiency Robustness (%) | Outermost Surface Thickness(μm) |
|---|---|---|---|---|---|---|
| Comparative 1 | Ceramer, no nanoparticles | Sticking | Sticking | 13.0 | | |
| Comparative 2 | Ceramer, no nanoparticles | NA | NA | NA | NA | NA |
| Comparative 3 | Fluoroceramer, no nanoparticles | NA | NA | NA | NA | NA |

TABLE II-continued

| Example | Outermost Surface Layer | COF Static | COF Kinetic | Average Surface Roughness (Ra) (nm) | Transfer Efficiency Robustness (%) | Outermost Surface Thickness(μm) |
|---|---|---|---|---|---|---|
| Comparative 4 | Polycarbonate, no inorganic nanoparticles, no compliant layer | <1 | <1 | NA | NA | NA |
| Comparative 5 | Polyimide, no inorganic nanoparticles, no compliant layer | <1 | <1 | NA | NA | NA |
| Comparative 6 | Fluoroceramer with nanoparticles, too thick | 0.61 | 0.41 | 19.6 | 0.1 | 4.2 |
| Comparative 7 | Fluoroceramer with nanoparticles, too thick | 0.28 | 0.14 | 22.0 | 2.9 | 4.8 |
| Invention 1 | Fluoroceramer with nanoparticles | 0.25 | 0.23 | 17.5 | 1.00 | 3.7 |
| Invention 1a* | Fluoroceramer with nanoparticles | 0.90 | 0.50 | 16.8 | 0.72 | 2.6 |
| Invention 2 | Fluoroceramer with nanoparticles | 0.20 | 0.18 | 40.0 | NA | 2.6 |
| Invention 3 | Fluoroceramer with nanoparticles | 0.24 | 0.22 | NA | NA | 1.9 |
| Invention 4 | Fluoroceramer with nanoparticles | 0.27 | 0.23 | NA | NA | 3.8 |
| Invention 5 | Fluoroceramer with nanoparticles | 0.35 | 0.31 | 24.7 | 1.67 | 1.9 |
| Invention 6 | Fluoroceramer with nanoparticles | 0.31 | 0.28 | 49.5 | 2.18 | 1.8 |
| Invention 7 | Fluoroceramer with nanoparticles (ring coated) | 0.43 | 0.38 | NA | NA | NA |
| Invention 8 | Fluoroceramer with nanoparticles | 0.43 | 0.37 | 38.1 | 0.56 | 1.5 |
| Invention 9 | Fluoroceramer with nanoparticles | 0.35 | 0.30 | 13.0 | 1.45 | 1.8 |
| Invention 10 | Fluoroceramer with nanoparticles | 0.35 | 0.31 | 17.5 | 0.97 | 3.4 |
| Invention 11 | Fluoroceramer with nanoparticles | 0.30 | 0.27 | 34.3 | 0.76 | 2.3 |
| Invention 12 | Fluoroceramer with nanoparticles | 0.39 | 0.33 | NA | 0.10 | 3 |
| Invention 13 | Fluoroceramer with nanoparticles | 0.58 | 0.45 | NA | 1.00 | 2.6 |
| Invention 13a** | Fluoroceramer with nanoparticles | NA | NA | 15.0 | 0.31 | NA |
| Invention 14 | Fluoroceramer with nanoparticles | 1.35 | 0.70 | 27.5 | NA | 3.2 |
| Invention 15 | Fluoroceramer with nanoparticles | 0.65 | 0.45 | 50.7 | NA | 3.1 |
| Invention 16 | Ceramer with nanoparticles | 4.10 | 1.65 | 20.9 | 0.40 | 3.6 |
| Invention 17 | Ceramer with nanoparticles | 2.58 | 1.40 | 27.3 | 1.05 | 3.0 |
| Invention 18 | Ceramer with nanoparticles | 4.05 | 1.72 | 23.6 | 0.09 | 3.9 |
| Invention 19 | Ceramer with nanoparticles | 3.90 | 1.95 | 9.2 | 0.25 | NA |
| Invention 20 | Ceramer with nanoparticles | 0.66 | 0.59 | 61.9 | 2.23 | 4.0 |
| Invention 21 | Ceramer with nanoparticles | 0.52 | 0.49 | 31.7 | NA | 3.4 |
| Invention 22 | Ceramer with nanoparticles | 0.50 | 0.45 | NA | NA | 4.6 |
| Invention 23 | Ceramer with nanoparticles | 0.30 | 0.30 | 30.7 | 2.9 | 3.0 |

*Invention 1 measured after 5,000 prints
**Invention 13 measured after 5,000 prints
NA = not applicable Invention Example 1 shows that the combination of fluorinated segments and nanosized silica particles provides an outermost surface layer in an intermediate transfer member with a low coefficient of friction and good mechanical properties. A fluoroceramer is expected to have a lower coefficient of friction than a ceramer due to the fluorinated segments at the surface of the coating. The nanosized silica particles serve to increase the mechanical properties of the fluorinated layer.

This combination produces a ceramer layer with a low coefficient of friction and a high transfer efficiency robustness. Both the static and dynamic (kinetic) coefficients of friction were below 0.3, approximately the value obtained for a non-compliant transfer belt made of polycarbonate in Comparative Example 3. Atomic Force Microscopy (AFM) showed an average surface roughness (Ra) of 17.5 nm, compared to the coating containing the ceramer without nanosized silica particles that had a Ra of less than 15 μm. Comparative Example 1 of the ceramer coating on E1150 polyurethane compliant layer showed a Ra of 13 nm. Additionally the silica particles in the ceramer coating containing the Organosilicasol™ would be expected to increase the yield strength of the coating. Coatings of the ceramer-particle layer on PET were similar to those made on polyurethane, indicating the substrate was not an important factor for the formation of the ceramer outermost surface layer. The surface roughness of the coating on PET was slightly higher at Ra of 30 nm, perhaps suggesting more compatibility of the ceramer with the compliant layer than with the PET. The adhesion of the ceramer outermost surface layer to the urethane was very good, as there was not any evidence of delamination or cracking.

Analysis with a light microscope or a scanning electron microscope did not reveal differences between the coatings with and without particles, even at 10,000× magnification. Analysis of the intermediate transfer belt showed the outermost surface layer produced good image quality prints on several papers of various textures. The images were superior to those produced using a non-compliant belt of Comparative Examples 4 and 5. The transfer efficiency robustness of the belt was very good with a reading of 1.0%, and improved to 0.72% after more than 5000 prints were produced using this belt (Invention Example 1a). The belt remained free of toner and paper scum during the entire test, and the surface maintained a high reflectivity. The thickness of the layer was reduced at the end of the test from 3.7 to 2.6 μm, indicating some wear of the outermost surface layer may have occurred. The coefficient of friction of the used belt increased to 0.9 for the static measurement and 0.5 for the kinetic measurement. Analysis of the surface of the used belt with optical, scanning, and atomic force microscopy indicated very little change in the coating surface. The surface roughness showed little change at 16.8 nm. No cracking was observed in the belt. A separate test by running the belt around small diameter rollers for more than 80,000 cycles also failed to induce any change in the outermost surface layer, such as cracking or delamination.

The surface of the fluoroceramer intermediate transfer belts were especially bright or polished even after many prints were made. The non-fluorinated ceramer belts also performed well, but the surfaces tended to dull as the number of prints increased. This difference in surface properties may be due to the fluorinated diol block in the fluoroceramer. TABLE III below shows the results of surface analysis using X-ray Photoelectron Spectroscopy (XPS) to compare the low coefficient of friction coatings of the fluoroceramer using in Invention Example 1 with the ceramer used in Invention Example 23. The fluorine content was detected at greater than 1% as the surface was sampled from 10 to 100 μm in depth. As expected, the ceramer coating did not have any fluorine at the surface. In TABLE III below, three-point angle resolved XPS (3-Point ARXPS) data show the atomic concentrations acquired at 15°, 45°, and 85° electron take off angle (ETOA) that correspond to an approximate analysis depth of approximately 10 Å, 50 Å, and 100 Å. The atomic concentrations in TABLE III were determined from survey scans. These data suggest that this beneficial behavior has been extended to the fluoroceramers used in the practice this invention, even though the level of silica was high and the surface had been roughened.

TABLE III

| | | % ATOMIC CONCENTRATION 3-POINT ARXPS | | | | |
|---|---|---|---|---|---|---|
| Analyses Depth (μm) | Sample | % Carbon | % Oxygen | % Silicon | % Nitrogen | % Fluorine |
| 10 | Invention Example 23 | 93.26 | 3.71 | 1.32 | 1.72 | |
| 50 | Invention Example 23 | 91.87 | 4.73 | 0.69 | 2.71 | |
| 100 | Invention Example 23 | 91.48 | 5.23 | 0.50 | 2.78 | |
| 10 | Invention Example 1 | 90.48 | 5.10 | 1.57 | 0.99 | 1.85 |
| 50 | Invention Example 1 | 88.00 | 6.27 | 1.39 | 2.97 | 1.37 |
| 100 | Invention Example 1 | 86.38 | 7.61 | 1.50 | 3.05 | 1.46 |

Figure 2:
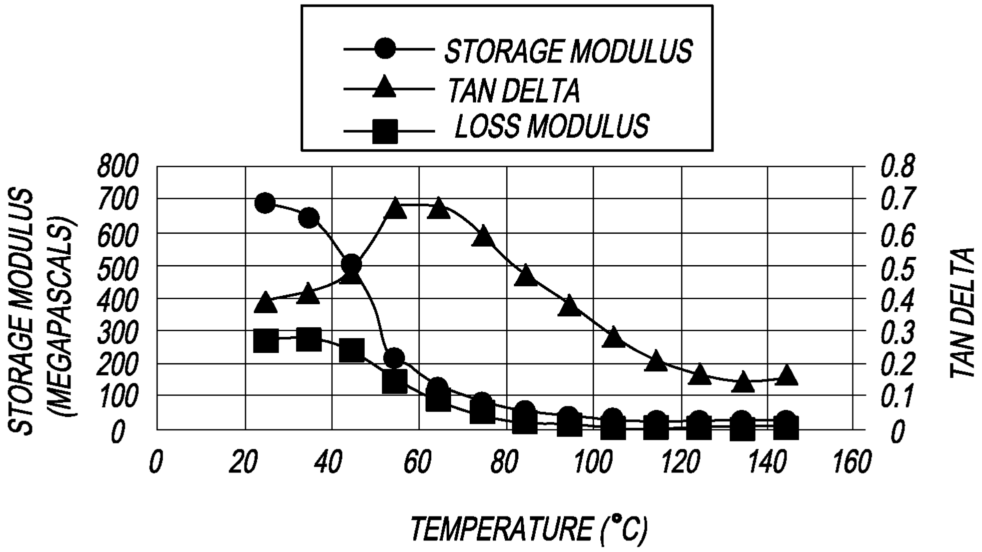
FIG. 2 is a graphical representation of the Dynamic Mechanical Analysis obtained for the outermost surface layer coating used in Invention Example 2 below.

Invention Example 2 shows that lowering the level of the TEOS crosslinking agent in preparing the outermost surface layer did not greatly change the properties of the coating. Additionally, free standing films cast from the outermost surface layer formulation of Invention Example 2 had similar physical properties to those of Comparative Example 2. Dynamic Mechanical Analysis of the film indicated the modulus was not greatly affected by the presence of the nanosized inorganic particles, suggesting that the fumed silica particles do not act as reinforcing filler and do not make the coating more brittle. FIG. 2 shows storage modulus, loss modulus, and tan delta data for Invention Example 2. The initial storage modulus at room temperature was approximately 700 MPa and the storage modulus decreased as the temperature was increased.

Figure 3:
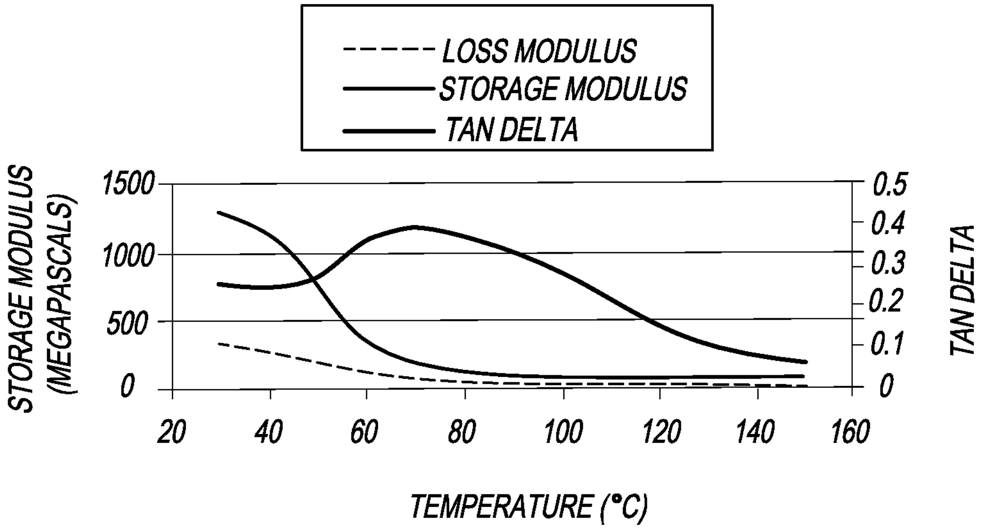
FIG. 3 is a graphical representation of the Dynamic Mechanical Analysis obtained for the outermost surface layer coating used in Comparative Example 2 below.

FIG. 3 shows the Dynamic Mechanical Analysis spectrum of the outermost surface coating used in Comparative Example 3, which was a fluoroceramer without nanosized inorganic particles. The initial storage modulus was higher at about 1300 MPa, probably due to more efficient crosslinking by the TEOS. However the storage modulus also decreased rapidly with temperature. The tan delta maximum for storage modulus and loss modulus was approximately 70° C., indicating a similar Tg for the two ceramer compositions that is probably related to the curing temperature of 80° C.

Figure 4:
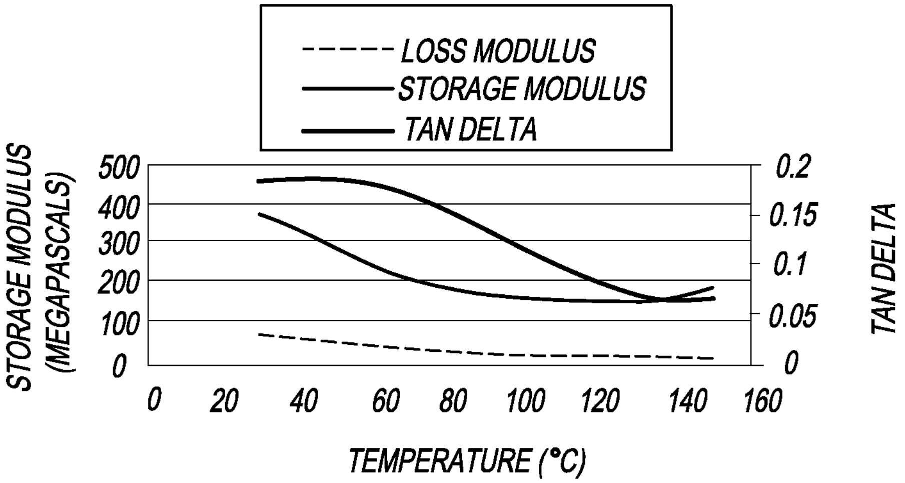
FIG. 4 is a graphical representation of the Dynamic Mechanical Analysis obtained for the outermost surface layer coating used in Comparative Example 3 below.

FIG. 4 shows the Dynamic Mechanical Analysis spectrum of the outermost surface layer coating used in Comparative Example 2, which was a non-fluoroceramer without nanosized particles. The initial storage modulus was higher at about 500 MPa, about the same as for the fluoroceramer coating containing silica shown in FIG. 2. The storage modulus also decreased with temperature. The tan delta maximum for both storage modulus and loss modulus was approximately 70° C., indicating a similar Tg for the two fluoroceramers.

The level of inorganic particles in a coating was determined by Thermal Gravimetric Analysis (TGA) at 800° C. in air. At these temperatures, the silica suboxide $SiO_x$ from the TEOS is converted into silica. Although the initial level of TEOS in the fluoroceramer formulation that does not contain added silica (Comparative Example 2) is almost 60 weight % of the total formulation, complete hydrolysis and condensation to form $SiO_2$ leaves 29% as silica. This value seems reasonable as one would expect approximately 30% silica if TEOS is converted to silica. Of course, the level of suboxide in the actual coating is somewhere in between these levels, depending on the amount of reaction that takes place during the 80° C. and 24 hour cure conditions.

Invention Example 24 was the fluoroceramer used in Comparative Example 2 but with nanosized silica particles added to the outermost surface layer formulation. The MEK-ST was about 30% solids, and the weight of silica was about equal to the amount of silica produced from the TEOS. This would be expected to produce a final value of approximately 50 weight % silica as final product in the TGA. The actual value reported in TABLE III was slightly higher at 55 weight % silica.

The higher levels of TEOS in Invention Examples 14 and 15 and Comparative Examples 6 and 7 did not increase the level of silica in the final outermost surface layer samples. Using the same assumptions made above, one would predict the value of 66 weight % silica. Perhaps at some point the TEOS level is tempered by the volatility of the monomer, and the level does not increase as expected. However the higher TEOS levels seem to improve the transfer efficiency robustness. It also led to cracking when the coatings were thicker, indicating that these samples were more brittle.

TABLE IV

| Example | Masterbatch | TEOS/ polymer | TEOS initial (weight %) | Organo-silicasol™ silica/ TEOS | $SiO_2$ Weight % (TGA @ 800° C.) |
|---|---|---|---|---|---|
| Comparative 2 | Ceramer | 1.87 | 65.2 | 0 | 35.1 |
| Comparative 3 | 10% Fluoroceramer | 1.47 | 59.5 | 0 | 29.3 |
| Invention 24 | 10% Fluoroceramer | 1.47 | 59.5 | 0.69 | 55.0 |
| Invention 14 | 10% Fluoroceramer | 2.94 | 74.6 | 0.34 | 49.1 |
| Comparative 6 | 10% Fluoroceramer | 2.94 | 74.6 | 0.34 | 52.3 |
| Invention 15 | 10% Fluoroceramer | 2.94 | 74.6 | 0.34 | 50.5 |
| Comparative 7 | 10% Fluoroceramer | 2.94 | 74.6 | 0.34 | 55.2 |

Cracking of the ceramer or fluoroceramer outermost surface layer was observed when the layers containing high levels of TEOS were coated as thicker outermost surface layers. Fine lines across the belt were observed after the intermediate transfer belt was used in the printer to make test images.

The invention has been described in detail with particular reference to certain preferred embodiments thereof, but it will be understood that variations and modifications can be effected within the spirit and scope of the invention.

PARTS LIST

| | |
|---|---|
| 2 | Electrophotographic printer |
| 2a | Secondary transfer station |
| 2b | Fusing station |
| 4 | Processor |
| 6 | Motor |
| 8 | Rotational transport path |
| 10 | Sheet path |
| 12 | Intermediate transfer member |
| 14 | Roller |

-continued

PARTS LIST

| | |
|---|---|
| 16 | Drive roller |
| 18K, 18C,-18M, 18Y | Electrophotographic modules |
| 22 | Negatively-charged toner |
| 26a, 26b | Nipped transfer rollers |
| 30a, 30b | Nipper fuser rollers |
| 300 | Sheet (including charged sheet) |
| 300a | Untoned side of sheet |
| 300b | Toner side of sheet |

The invention claimed is:

1. An intermediate transfer member comprising:

a substrate, a non-ceramer polyurethane compliant layer, and disposed directly on the compliant layer, an outermost surface layer consisting essentially of a non-particulate, non-elastomeric ceramer or fluoroceramer and nanosized inorganic particles that are distributed within the non-particulate ceramer or fluoroceramer in an amount of at least 5 and up to and including 50 weight % of the outermost surface layer.

2. The intermediate transfer member of claim 1 wherein the inorganic particles have an average largest dimension of at least 1 and up to 500 nm.

3. The intermediate transfer member of claim 1 wherein the inorganic particles have an average largest dimension of at least 10 and up to and including 100 nm.

4. The intermediate transfer member of claim 1 wherein the inorganic particles are triboelectrically charging metal oxide particles.

5. The intermediate transfer member of claim 1 wherein the inorganic particles are silica or alumina particles.

6. The intermediate transfer member of claim 1 wherein the ceramer comprises a polyurethane silicate hybrid organic-inorganic network formed as a reaction product of a non-fluorinated polyurethane having terminal reactive alkoxysilane groups with a tetraalkoxysilane compound, and the fluoroceramer comprises a fluorinated polyurethane silicate hybrid organic-inorganic network formed as a reaction product of a fluorinated polyurethane having terminal reactive alkoxysilane groups with a tetraalkoxysilane compound.

7. The intermediate transfer member of claim 6 wherein the ceramer polyurethane having terminal alkoxysilane groups comprises the reaction product of one or more aliphatic non-fluorinated polyols having terminal hydroxyl groups and an alkoxysilane alkyl-substituted isocyanate compound, and the fluoroceramer polyurethane having terminal alkoxysilane groups comprises the reaction product of one or more fluorinated aliphatic polyols having terminal hydroxyl groups, one or more non-fluorinated aliphatic polyols having terminal hydroxyl groups, and an alkoxysilane alkyl-substituted isocyanate compound.

8. The intermediate transfer member of claim 1 that is an endless belt.

9. The intermediate transfer member of claim 1 wherein the outermost surface layer has a thickness of at least 1 μm and up to and including 20 μm.

10. The intermediate transfer member of claim 1 wherein the outermost surface layer has a thickness of at least 5 μm and up to and including 12 μm.

11. The intermediate transfer member of claim 1 wherein the ratio of the thickness of the outermost surface to the thickness of the compliant layer is at least 0.002:1 and up to and including 0.1:1.

12. The intermediate transfer member of claim 1 wherein the outermost surface layer has a surface roughness, Ra of less than 50 nm.

13. The intermediate transfer member of claim 1 wherein the outermost surface layer has a static or dynamic (kinetic) coefficient of friction less than 0.4.

14. The intermediate transfer member of claim 1 wherein the outermost surface layer is transparent.

15. The intermediate transfer member of claim 1 wherein the compliant layer has a thickness of at least 100 μm and up to and including 500 μm.

16. The intermediate transfer member of claim 1 wherein the ceramer or fluoroceramer comprises at least 50 and up to and including 95 weight % of the outermost surface layer.

17. The intermediate transfer member of claim 1 wherein the outermost surface layer has a storage modulus of at least 0.1 and up to and including 2 GPa.

18. An apparatus comprising:

a toner-image forming unit that uses a developer containing a toner to form a toner image on a toner image carrier, and the intermediate transfer member of claim 1.

19. The apparatus of claim 18 further wherein the toner image carrier is a photoconductor.

20. The apparatus of claim 18 wherein the toner-image forming unit has a charging device that produces electric charge on the toner image carrier, an exposure device that forms an electrostatic latent image on the image carrier, and a developing device that develops the electrostatic latent image with the developer containing the toner to form a toner image.

21. The apparatus of claim 18 that further comprises a receiver element device that can hold receiver elements to which the toner image can be transferred from the intermediate transfer member.

22. The apparatus of claim 18 further comprising a fixing unit for fixing the toner image on a receiver element.

23. A method of providing a toner image on a receiver element, comprising:

A) forming an electrostatic latent image on an image carrier,

B) developing the latent image with a dry developer comprising toner particles to form a toner image, C) transferring the toner image to the intermediate transfer member of claim 1, and D) transferring the toner image from the intermediate transfer member to a receiver element.

24. The method of claim 23 further comprising fixing the toner image on the receiver element.

* * * * *